Oct. 16, 1962  N. P. JÖRGENSEN  3,058,204
METHOD FOR THE PRODUCTION OF HAND WHEELS FROM A SINGLE BLANK
Filed June 23, 1958  3 Sheets-Sheet 1
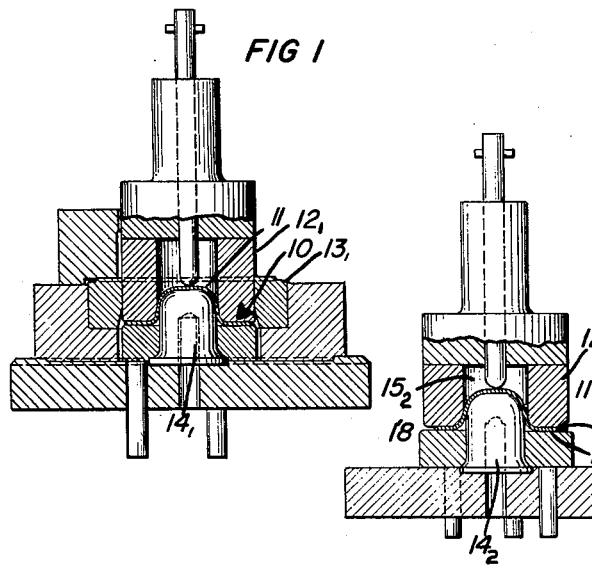
FIG 1
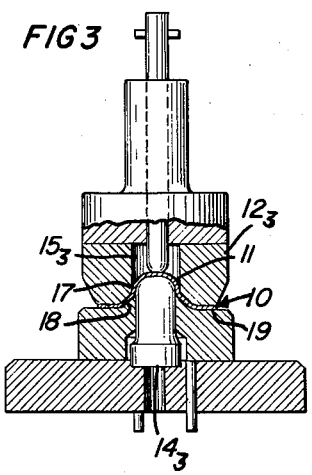
FIG 2
FIG 3
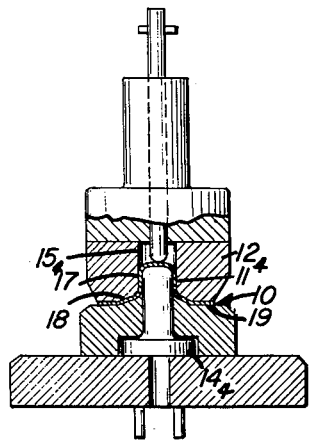
FIG 4
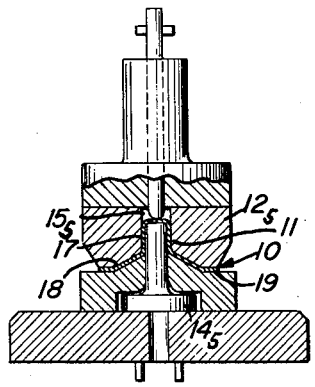
FIG 5
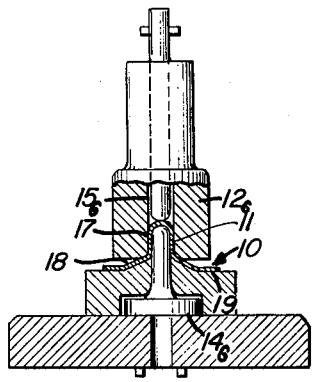
FIG 6
INVENTOR
*Niels Peter Jorgensen*
BY *Wenderoth, Lind & Ponack*
ATTORNEYS Oct. 16, 1962     N. P. JÖRGENSEN     3,058,204
METHOD FOR THE PRODUCTION OF HAND WHEELS FROM A SINGLE BLANK
Filed June 23, 1958     3 Sheets-Sheet 2

INVENTOR
*Niels Peter Jorgensen*

BY *Wenderoth, Lind & Ponack*

ATTORNEYS

Oct. 16, 1962   N. P. JÖRGENSEN   3,058,204
METHOD FOR THE PRODUCTION OF HAND WHEELS FROM A SINGLE BLANK
Filed June 23, 1958                    3 Sheets-Sheet 3

INVENTOR
Niels Peter Jörgensen

BY Wenderoth, Lind and Ponack
ATTORNEYS

United States Patent Office 3,058,204
Patented Oct. 16, 1962

3,058,204
METHOD FOR THE PRODUCTION OF HAND
WHEELS FROM A SINGLE BLANK
Niels Peter Jörgensen, 13 Ronnevej, Naesby, Denmark
Filed June 23, 1958, Ser. No. 743,951
Claims priority, application Denmark June 13, 1953
4 Claims. (Cl. 29—159)

The present invention relates to a method for the production of hand wheels for valves, cocks, taps and the like by forming the hand wheel from a single blank cut from a metal plate by a succession of simultaneous drawing and upsetting steps performed on the blank.

This application is a continuation-in-part of my application Serial No. 435,245, filed June 8, 1954, now abandoned.

Hand wheels of this type which merely have a polygonal hole cut in the center of the hand wheel to fit over the valve stem are not sufficiently strong to secure the hand wheel to the valve stem. In hand wheels formed from plate material by stamping, drawing, etc., the boss of the hand wheel should surround the valve stem along the entire length of the portion projecting above the valve housing, as is the case with hand wheels which are cast. Heretofore it has not been possible to make such a boss from the material of the same plate as is formed into the hand wheel, since the drawing operations necessary to draw out the boss reduce the thickness of the material of the plate so that it is weakened and may even be cracked. The usual manner of fabricating such a hand wheel is to form the boss separately and secure it to the hand wheel by means of pins on the boss which fit into holes on the hand wheel and are secured thereto by bending or riveting, or by simply welding the boss portion to the hand wheel. Such hand wheels are unsatisfactory in that the boss often works loose when the handles are exposed to the usual operating stresses and strains.

The object of the present invention is to provide a method for forming hand wheels from a single blank cut from a sheet of metal, in which steps are performed on the blank which increase the thickness of the blank in the area of the boss.

It is a further object of the present invention to provide a method whereby steps are performed on a blank to draw the blank and upset it to thicken the blank in the area of the boss and the area at which the boss joins the handle portion of the hand wheel.

Other and further objects will become apparent from the following specification and claims taken together with the drawings in which:

FIGS. 1 through 7 illustrate schematically a series of drawing and upsetting steps performed on a cold circular blank, the dies being shown in elevation and partially vertically sectioned;

Figure 7:
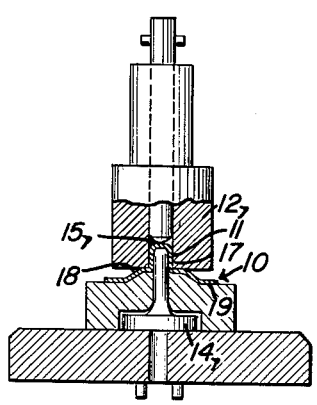

Referring now to the figures, in which is shown a sequence of steps for forming a medium sized hand wheel, FIG. 1 shows a circular blank 10 being drawn to produce a bowl-like depression 11 therein. In the figure, there is also shown a pair of cutting dies $12_1$ and $13_1$ which may be utilized to cut the blank 10 from a larger sheet of metal (not shown) before the drawing step takes place. The single stroke of the upper dies $13_1$ both cuts the blank 10 out of the plate material and forces it down over the central mandrel $14_1$.

It should be mentioned at this point that the diameter of the blank 10 should be such that there is a sufficient volume of material therein to provide sufficient material for the desired thickness of the boss and handle portion of the finished hand wheel. Further, the size of the bowl-like depression 11 must be such that sufficient material is contained therein to provide the thickened boss portion. It will be obvious to those skilled in the art that for hand wheels of different sizes, the dimensions of the blank and the bowl-like depression will vary. It has been found that for a hand wheel of approximately 2⅜ inches in diameter a circular blank of 3 inches is sufficient. FIG. 2 shows a further drawing operation which deepens the bowl-like depression to substantially its final depth. A bowl-like depression with a depth of 11/16 inch is sufficient.

It will also be clear that the combined cutting and drawing step illustrated in FIG. 1 may be broken down into two separate steps, a cutting step and a drawing step. The same may be true of other steps illustrated and described, and it will be understood that the invention is not limited to these exact combinations of cutting, drawing, upsetting and shaping operations, but includes other such combined steps as will be obvious to one skilled in the art.

FIG. 3 shows the first combined drawing and upsetting step in which the diameter of the bowl-like depression 11 is slightly reduced, while at the same time it is drawn to a slightly greater depth. The combined action is obtained by increasing the length of the mandrel $14_3$ slightly and reducing the size of the aperture $15_3$ in the downwardly moving die $12_3$. The diameter of the mandrel $14_3$ is also decreased, but to a slightly greater degree than the diameter of the aperture $15_3$ in the die $12_3$. The reduction in the diameter of the aperture $15_3$ in the die $12_3$ squeezes the material in the periphery of the bowl-like depression 11 toward the center of the bowl-like depression, thereby slightly increasing the thickness of the side wall 17 thereof. This is due to the fact that the amount of material in the side wall 17 of the bowl-like depression 11 at the first diameter is squeezed into a smaller diameter. The smaller diameter bowl-like depression must therefore have a greater wall thickness. Because the mandrel $14_3$ has a diameter which has been reduced by an amount greater than the amount by which the aperture $15_3$ has been reduced, there is provided the increased space between the die and the mandrel which is necessary to accommodate this greater wall thickness. At the same time a certain amount of the material is drawn downwardly into the portion 18 of the blank 10 where the bowl-like depression 11 is joined to the laterally extending portion 19 of the blank which is to form the handle.

FIGS. 4, 5, 6 and 7 show a series of further combined drawing and upsetting operations each of which acts in substantially the same way as the step of FIG. 3. By the time the blank has been acted upon through the series of steps, the bowl-like depression 11 has been formed into substantially the same dimensions as the finished boss will have. The thickness of the side wall 17 has been increased substantially and at the same time certain of the material from the side wall 17 has been drawn into the portion 18 between the bowl-like depression 11 and the laterally extending portion 19 to increase the thickness at this point also. These thicknesses are substantially greater than the thickness of the plate from which the blank 10 was initially cut.

It should be noted that for small hand wheels, the number of steps necessary to achieve the desired thickness of the boss will be less than the number of steps required in the case of a large hand wheel. The precise number of steps is thus not critical, it only being necessary that the drawing and upsetting steps be sufficient in number to make the thickness of the boss and the area between the boss and the laterally extending portion of the blank the desired thickness.

Likewise, the precise shape and dimensions of the dies for performing these drawing and upsetting steps may vary depending upon the final shape and size of the boss which is desired. What is essential to the present process is that these dies reduce the diameter of the bowl-like depression 11 so that the thickness of the wall 17 of the depression is increased and at the same time material is drawn into the portion 18 between the bowl-like depression 11 and the laterally extending portion 19 of the blank.

Figure 8:
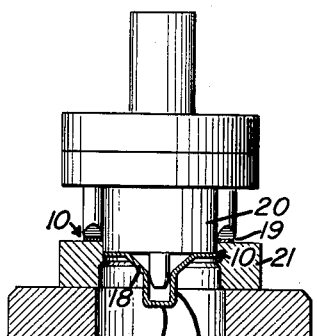
FIG. 8 shows a cutting step performed on the partially formed blank, the dies likewise being shown in elevation and partially vertically sectioned.

FIG. 8 shows a cutting step by which cutting dies 20 and 21 cut the external periphery of the blank to provide depressions therein so that when the edge of the blank 10 is bent over it will be undulated to provide a better grip.

Figure 9:
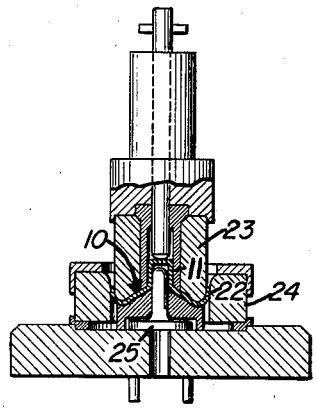
FIGS. 9 through 12 show bending and upsetting steps performed on a blank, the dies likewise being shown in elevation and partially vertically sectioned.

FIG. 9 shows the first bending over of the edge portion 22 of the laterally extending part 19 of the blank. This is accomplished by properly shaped co-acting dies 23 and 24 and a mandrel 25.

Figure 10:
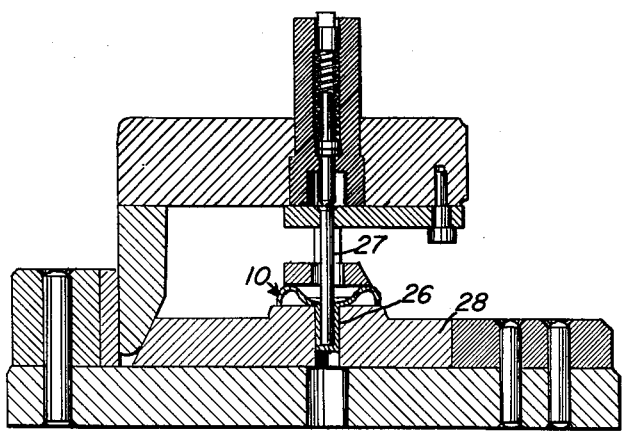
Figure 16:
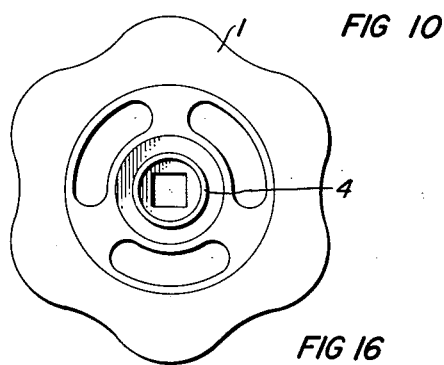
FIG. 16 is a plan view of the finished hand wheel shown in FIG. 15.

FIG. 10 shows the forming of the depression 11 into a polygonal shaped boss 26. The die portions 27 and 28 forming the internal surface and the external surface of the boss have complementary polygonal shapes, the number of sides of the polygon depending upon the shape of the boss desired.

Figure 11:
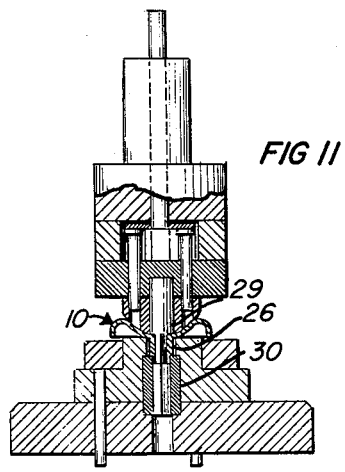

FIG. 11 shows a cutting step by which the bottom is cut from the depression by means of cutting dies 29 and 30 having a shape the same as the die 27 of FIG. 10 for forming the interior of the boss 26.

Figure 12:
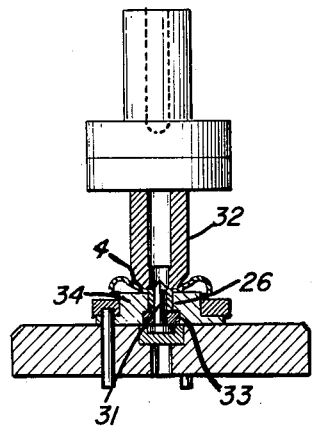

FIG. 12 illustrates the step of finishing the boss 26 to its final length and further upsetting it to give to the wall the final thickness. This is accomplished by supporting the interior of the boss on a polygonal die 31 of the proper shape and applying pressure to the ends of the boss 26 by means of upper die 32 and lower die 33 while at the same time surrounding the exterior of the boss with a die 34 of the proper shape to confine the spread of the material in the boss 26 to the proper and desired shape. At the same time an abutment 4 may be formed around the central bore through the boss 26 on the upper surface of the laterally extending portion 19 of the blank.

Figure 13:
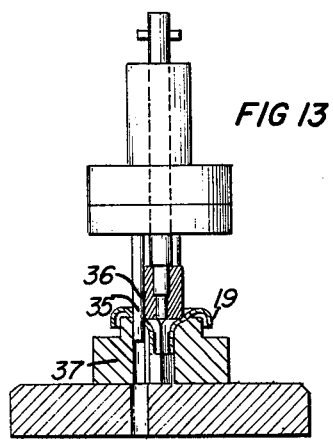
FIG. 13 shows a cutting step with the dies being shown as before.
Figure 13A:
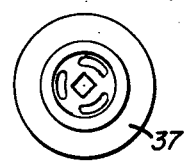
FIG. 13a is a plan view of the lower cutting dies of FIG. 13.

FIG. 13 illustrates the step of cutting apertures 35 in the laterally extending portion 19 of the blank 10 by cooperating cutting dies 36 and 37 in the shape as shown in FIG. 13a, thereby forming spokes in the hand wheel. It is obvious that any number of apertures 35 can be cut depending upon the number of spokes desired in the finished hand wheel.

Figure 14:
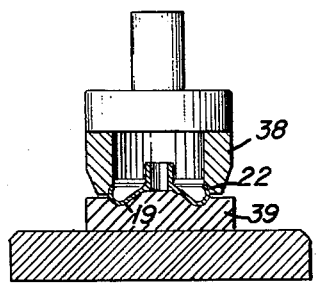
FIG. 14 shows a final shaping step with the dies being shown as before.

FIG. 14 illustrates the final bending step by which the edge portion 22 of the laterally extending portion 19 of the blank are bent under by means of cooperating dies 38 and 39 to finish the handle portion.

Figure 15:
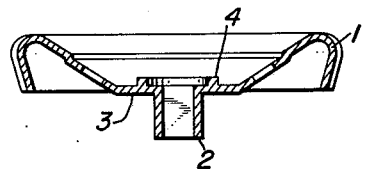
FIG. 15 is a sectional elevation view of a finished hand wheel.

FIG. 15 illustrates the finished hand wheel, in which the boss 26 is shown as being thicker than the material of the laterally extending handle portion 19 and the central portion 18 immediately around the boss 26 is also thicker than the handle portion 19. The annular shoulder 4 is shown as formed on the upper surface of the thickened central portion 18.

It is thus seen that by performing a plurality of simultaneous drawing and upsetting steps on the bowl-like depression, the steps being performed in succession, and each of which comprises supporting the inside of the bowl-like depression on a mandrel of a diameter less than the diameter of the bowl-like depression and forcing the material in the side of the bowl-like depression downwardly and inwardly, the thickness of the side of the bowl-like depression and the thickness of the area of the blank where it joins the bowl-like depression is increased, thereby making it possible to form a single piece hand wheel having a boss and central portion thicker than the material from which the handle is formed.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. In a method for the production of hand wheels for valves, cocks, taps and the like, said hand wheel having a central boss extending perpendicular to the plane of the hand wheel and with a polygonal aperture axially of the boss, the steps of cutting a circular blank having a diameter larger than the diameter of a finished hand wheel from a sheet of metal, upsetting the blank in the central area thereof to form a bowl-like depression, and increasing the thickness of the side of the bowl-like depression and increasing the thickness of the area of the plate where it joins the bowl-like depression to a thickness greater than the thickness of the blank by performing a succession of cold drawing and upsetting steps on said bowl-like depression each comprising supporting the inside of the bowl-like depression on a mandrel of a diameter less than the diameter of and a height slightly greater than the height of the bowl at the end of the preceding step and simultaneously forcing the material in the side of the bowl-like depression toward the plane of the blank edge and inwardly of the bowl.

2. In a method for the production of hand wheels for valves, cocks, taps and the like, said hand wheel having a central boss extending perpendicular to the plane of the hand wheel and with a polygonal aperture axially of the boss, the steps of cutting a circular blank having a diameter larger than the diameter of a finished hand wheel from a sheet of metal, upsetting the blank in the central area thereof to form a bowl-like depression having a height greater than the length of the central boss to be given to the hand wheel and a diameter greater than the outside diameter of the boss, and increasing the thickness of the side of the bowl-like depression and increasing the thickness of the area of the plate where it joins the bowl-like depression to a thickness greater than the thickness of the blank by performing a succession of cold drawing and upsetting steps on said bowl-like depression each comprising supporting the inside of the bowl-like depression on a mandrel of a diameter less than the diameter of and a height slightly greater than the height of the bowl at the end of the preceding step and simultaneously forcing the material in the side of the bowl-like depression toward the plane of the blank edge and inwardly of the bowl.

3. In a method for the production of hand wheels for valves, cooks, taps and the like, said hand wheel having a central boss extending perpendicular to the plane of the hand wheel and with a polygonal aperture axially of the boss, the steps of cutting a circular blank having a diameter larger than the diameter of a finished hand wheel from a sheet of metal, upsetting the blank in the central area thereof to form a bowl-like depression having a height greater than the length of the central boss to be given to the hand wheel and a diameter greater than the outside diameter of the boss, and increasing the thickness of the side of the bowl-like depression and increasing the thickness of the area of the plate where it joins the bowl-like depression to a thickness greater than the thickness of the blank by performing a succession of cold drawing and upsetting steps on said bowl-like depression each comprising supporting the inside of the bowl-like depression on a mandrel of a diameter less than the diameter of and a height slightly greater than the height of the bowl at the end of the preceding step and simultaneously forcing the material in the side of the bowl-like depression toward the plane of the blank edge and inwardly of the bowl, cutting the closed end out of the bowl-like depression to form a boss, forming the interior of said boss in the shape of a polygon, and applying pressure to the end of said boss while supporting the other end of the boss and confining the exterior of the boss for thickening the boss and giving it the desired length.

4. A method for the production of hand wheels for valves, cocks, taps and the like, said hand wheel having a central boss extending perpendicular to the plane of the hand wheel and with a polygonal aperture axially of the boss, the steps of cutting a circular blank having a diameter larger than the diameter of a finished hand wheel from a sheet of metal, upsetting the blank in the central area thereof to form a bowl-like depression having a height greater than the length of the central boss to be given to the hand wheel and a diameter greater than the outside diameter of the boss, and increasing the thickness of the side of the bowl-like depression and increasing the thickness of the area of the plate where it joins the bowl-like depression to a thickness greater than the thickness of the blank by performing a succession of cold drawing and upsetting steps on said bowl-like depression each comprising supporting the inside of the bowl-like depression on a mandrel of a diameter less than the diameter of and a height slightly greater than the height of the bowl at the end of the preceding step and simultaneously forcing the material in the side of the bowl-like depression toward the plane of the blank edge and inwardly of the bowl, cutting the closed end out of the bowl-like depression to form a boss, forming the interior of said boss in the shape of a polygon, applying pressure to the end of said boss while supporting the other end of the boss and confining the exterior of the boss for thickening the boss and giving it the desired length, bending over the edges of said blank, and cutting apertures in the blank to form a spoked hand wheel.

References Cited in the file of this patent

UNITED STATES PATENTS

| | | |
|---|---|---|
| 224,765 | Bennett | Feb. 24, 1880 |
| 469,785 | Hart | Mar. 1, 1892 |
| 1,265,954 | Pribil | May 14, 1918 |
| 1,368,565 | Limont | Feb. 15, 1921 |
| 1,623,059 | Lammine | Apr. 5, 1927 |
| 1,688,111 | Bohle | Oct. 16, 1928 |
| 1,837,097 | Barth | Dec. 15, 1931 |
| 2,165,472 | Friedman | July 11, 1939 |
| 2,196,731 | Husted | Apr. 9, 1940 |
| 2,460,720 | Thompson | Feb. 1, 1949 |
| 2,502,812 | Wright | Apr. 4, 1950 |

FOREIGN PATENTS

| | | |
|---|---|---|
| 571,675 | Great Britain | Sept. 4, 1945 |

OTHER REFERENCES

Metals Handbook, 1948 edition, published by American Society for Metals, pp. 43–44.